(12) United States Patent
Mason et al.

(10) Patent No.: US 12,494,478 B2
(45) Date of Patent: Dec. 9, 2025

(54) ELECTROACTIVE MATERIALS FOR USE IN METAL-ION BATTERIES

(71) Applicant: Nexeon Limited, Abingdon (GB)

(72) Inventors: Charles A. Mason, Abingdon (GB); Richard Gregory Taylor, Penarth (GB); Joshua Whittam, Faringdon (GB); Limunga Silo Meoto, Abingdon (GB); Mauro Chiacchia, Abingdon (GB)

(73) Assignee: Nexeon Limited, Abingdon (GB)

( * ) Notice: Subject to any disclaimer, the term of this patent is extended or adjusted under 35 U.S.C. 154(b) by 668 days.

(21) Appl. No.: 17/641,916

(22) PCT Filed: Sep. 10, 2020

(86) PCT No.: PCT/GB2020/052188
§ 371 (c)(1),
(2) Date: Mar. 10, 2022

(87) PCT Pub. No.: WO2021/048555
PCT Pub. Date: Mar. 18, 2021

(65) Prior Publication Data
US 2022/0336790 A1 Oct. 20, 2022

(30) Foreign Application Priority Data

Sep. 10, 2019 (GB) .................. 1913069
Jan. 21, 2020 (GB) .................. 2000833
Mar. 17, 2020 (GB) .................. 2003864

(51) Int. Cl.
| | | |
|---|---|---|
| H01M 4/36 | (2006.01) | |
| H01M 4/02 | (2006.01) | |
| H01M 4/134 | (2010.01) | |
| H01M 4/1395 | (2010.01) | |
| H01M 4/38 | (2006.01) | |
| H01M 4/62 | (2006.01) | |
| H01M 4/66 | (2006.01) | |

(52) U.S. Cl.
CPC .......... *H01M 4/364* (2013.01); *H01M 4/134* (2013.01); *H01M 4/1395* (2013.01); *H01M 4/386* (2013.01); *H01M 4/625* (2013.01); *H01M 4/663* (2013.01); *H01M 2004/021* (2013.01); *H01M 2004/027* (2013.01)

(58) Field of Classification Search
CPC .... H01M 4/364; H01M 4/134; H01M 4/1395; H01M 4/386; H01M 4/625; H01M 4/663; H01M 2004/021; H01M 2004/027; H01M 10/0525; H01M 2300/0071; H01M 4/362; H01M 10/0562; H01M 2300/0068; Y02E 60/10; Y02T 10/70; H01G 11/28; H01G 11/36; H01G 11/42; H01G 11/50; H01G 11/56; H01G 11/86; H01G 11/24; C01P 2002/74; C01P 2004/61; C01P 2004/64; C01P 2006/12; C01P 2006/14; C01P 2006/16

See application file for complete search history.

(56) References Cited

U.S. PATENT DOCUMENTS

| | | | |
|---|---|---|---|
| 2012/0064398 A1* | 3/2012 | Kim | H01M 4/625 |
| | | | 429/209 |
| 2014/0057179 A1* | 2/2014 | Yushin | H01M 4/366 |
| | | | 429/238 |
| 2014/0272592 A1* | 9/2014 | Thompkins | H01M 4/1395 |
| | | | 252/182.1 |
| 2017/0170477 A1* | 6/2017 | Sakshaug | H01M 4/362 |
| 2017/0352877 A1* | 12/2017 | Put | H01M 10/0413 |

FOREIGN PATENT DOCUMENTS

| | | |
|---|---|---|
| CN | 103208617 A | 7/2013 |
| WO | 2017/040299 A1 | 3/2017 |
| WO | 2018/165610 A1 | 9/2018 |
| WO | 2018/229515 A1 | 12/2018 |

OTHER PUBLICATIONS

International Search Report mailed on Nov. 24, 2020, issued in connection with International Application No. PCT/GB2020/052188, filed on Sep. 10, 2020, 4 pages.
Written Opinion mailed on Nov. 24, 2020, issued in connection with International Application No. PCT/GB2020/052188, filed on Sep. 10, 2020, 12 pages.
Xp055089322, "A Basic Guide to Particle Characterization", Malvern Instruments Worldwide—White Paper, 2012, 1-26.

\* cited by examiner

*Primary Examiner* — Lisa S Park
(74) *Attorney, Agent, or Firm* — Merchant & Gould P.C.

(57) ABSTRACT

This invention relates to particulate electroactive materials consisting of a plurality of composite particles, wherein the composite particles comprise: (a) a porous conductive particle framework including micropores and/or mesopores having a total volume of at least 0.4 to 2.2 cm$^3$/g; (b) an electroactive material disposed within the porous conductive particle framework; and (c) a lithium-ion permeable filler penetrating the pores of the porous conductive particle framework and disposed intermediate the nanoscale silicon domains and the exterior of the composite particles.

17 Claims, No Drawings

ELECTROACTIVE MATERIALS FOR USE IN METAL-ION BATTERIES

This application is a U.S. National Stage entry of International Patent Application no. PCT/GB2020/052188, filed Sep. 10, 2020, which claims the benefit of priority of United Kingdom Patent Applications nos. 1913069.9, filed Sep. 10, 2019; 2000833.0, filed Jan. 21, 2020; and 2003864.2, filed Mar. 17, 2020.

This invention relates to a particulate material consisting of a plurality of composite particles comprising an electroactive material and a lithium-ion permeable filler material within a conductive porous particle framework. The composite particles provide improved performance when used as electroactive materials in rechargeable metal-ion batteries.

Rechargeable metal-ion batteries are widely used in portable electronic devices such as mobile telephones and laptop computers. Rapid developments in electric and hybrid vehicle technology also represent a significant new market for high-performance rechargeable batteries. The anode of a metal-ion battery typically comprises a metal current collector provided with a layer of an electroactive material (which is defined herein as a material which is capable of inserting and releasing metal ions during the charging and discharging of a battery). When a metal-ion battery is charged, metal ions are transported from the metal-ion-containing cathode layer via the electrolyte and are inserted into the anode material.

Conventional lithium-ion batteries use graphite as the electroactive material in the anode. When a graphite-containing anode is charged, lithium intercalates between the graphite layers to form a material with the empirical formula $Li_xC_6$ (wherein x is greater than 0 and less than or equal to 1). This means that graphite has a maximum theoretical capacity of 372 mAh/g in a lithium-ion battery, with a practical capacity that is somewhat lower (ca. 340 to 360 mAh/g). The development of portable electronics and electric vehicles with high energy demands means that there is a need for electroactive materials that provide an improvement in the gravimetric and volumetric capacity of graphite.

Materials such as silicon, tin and germanium have a significantly higher capacity for inserted lithium atoms than graphite. Silicon in particular has been identified as a promising alternative to graphite for the manufacture of rechargeable metal-ion batteries having high gravimetric and volumetric capacities because of its very high capacity for lithium (see, for example, Insertion Electrode Materials for Rechargeable Lithium Batteries, Winter, M. et al. in Adv. Mater. 1998, 10, No. 10). At room temperature, silicon has a theoretical maximum specific capacity in a lithium-ion battery of about 3,600 mAh/g (based on $Li_{15}Si_4$).

The high specific capacity of silicon is accompanied by large volumetric changes on charging and discharging. Intercalation of lithium into bulk silicon leads to an increase in the volume of the silicon material of up to 400% of its original volume. Repeated charge-discharge cycles therefore cause significant mechanical stress in the silicon material, resulting in fracturing and delamination of the silicon anode material and deformation of other battery components. The contraction of silicon particles upon delithiation can result in a loss of electrical contact between the anode material and the current collector. A further problem is that a solid electrolyte interphase (SEI) layer forms on fresh silicon surfaces during the initial charging cycle as a result of electrolyte deposition. This SEI layer does not have sufficient mechanical tolerance to accommodate the expansion and contraction of the silicon and delaminates from the silicon surface. Newly exposed silicon surfaces then lead to further electrolyte decomposition and increased thickness of the SEI layer and irreversible consumption of lithium. These failure mechanisms collectively result in an unacceptable loss of electrochemical capacity over successive charging and discharging cycles.

A number of approaches have been proposed to overcome the problems associated with the volume change observed when charging silicon-containing anodes. One approach is to use some form of finely structured silicon as the electroactive material. Fine silicon structures below around 150 nm in cross-section, such as silicon films and silicon nanoparticles, are more tolerant of volume changes on charging and discharging when compared to silicon particles in the micron size range. However, neither of these is particularly suitable for commercial scale applications in their unmodified form; nanoscale particles are difficult to prepare and handle and silicon films do not provide sufficient bulk capacity. The relatively high surface area of finely structured silicon also results in unacceptable capacity loss on the first charging cycle due to excessive SEI formation.

To address the need for high capacity electroactive materials, the present applicant has proposed a composite material in which an electroactive material, such as silicon, is deposited in the pores of a porous conductive material (e.g. a carbon-containing porous material, such as an activated carbon material). It has been found that through careful control of the total pore volume, the pore size distribution of the porous conductive material, and the degree of occupancy of the pore volume by the electroactive material, it is possible to obtain a material with controlled expansion properties, limited SEI formation, and high reversible capacity retention. These composite materials therefore provide the beneficial charge-discharge properties of nanoscale silicon particles while avoiding the handling difficulties and capacity loss associated with nanoparticles.

The present application relates to a further development of the composite material described above, in which a lithium-ion permeable filler material is used to fill vacant pore volume remaining after an electroactive material, such as silicon, has been deposited into the pores of a porous framework material.

In a first aspect of the invention, there is provided a particulate material consisting of a plurality of composite particles, wherein the composite particles comprise:
   (a) a conductive porous particle framework comprising micropores and/or mesopores, wherein the micropores and/or mesopores have a total pore volume in the range from 0.4 to 2.2 cm$^3$/g;
   (b) a plurality of nanoscale electroactive material domains disposed within the conductive porous particle framework;
   (c) a lithium-ion permeable filler material penetrating the pores of the conductive porous particle framework and disposed intermediate the nanoscale electroactive material domains and the exterior of the composite particles.

The invention thus relates to a particulate material in which the structure of the composite particles is defined by a conductive porous particle framework, such as a porous carbon particle framework; an electroactive material is disposed in the pores of the conductive porous particle framework; and a lithium-ion permeable filler is situated in the pore volume remaining between the nanoscale electroactive material domains and the exterior of the composite particles. Thus, in general, the electroactive material is located more towards the centre of the conductive porous particle framework, and the lithium-ion permeable filler is located more towards the external boundary of the particles.

As used herein, the term "lithium ion permeable" refers to an ionically conductive material which allows the transport of lithium ions from the exterior of the composite particles to the nanoscale electroactive material domains. Preferably, the lithium-ion permeable filler material is impermeable to liquids, such as the solvents of liquid electrolytes.

By reducing the surface area of the composite particles and by sealing the nanoscale electroactive material domains away from electrolyte access, the use of the lithium-ion permeable filler provides an improvement in the performance of the composite particles when used as an electroactive material for lithium-ion batteries. In particular, the use of the lithium-ion filler reduces SEI formation by reducing the surface area of the composite particles and by preventing contact between the electrolyte and the nanoscale electroactive material domains in the particle interior. A reduction in the surface area of the composite particles also has the effect of reducing the amount of binder that is needed to form an electrode active layer comprising the composite particles. Excess binder is known to contribute to a reduction in rate performance. A further advantage of the invention is that the filler contributes to improved compressive strength of the composite particles by providing structural reinforcement to the conductive porous particle framework. The particulate material of the invention is also associated with various manufacturing advantages which are described below in further detail.

The conductive porous particle framework comprises a three-dimensionally interconnected open pore network comprising micropores and/or mesopores and optionally a minor volume of macropores. In accordance with conventional IUPAC terminology, the term "micropore" is used herein to refer to pores of less than 2 nm in diameter, the term "mesopore" is used herein to refer to pores of 2-50 nm in diameter, and the term "macropore" is used to refer to pores of greater than 50 nm diameter.

In the absence of any indication to the contrary, references herein to the volume of micropores, mesopores and macropores in the conductive porous particle framework, and also any references to the distribution of pore volume within the conductive porous particle framework, relate to the internal pore volume of the conductive porous particle framework measured in isolation—i.e. as measured in the absence of any electroactive materials or lithium-ion permeable fillers occupying the pore volume.

The conductive porous particle framework is characterised by a total volume of micropores and mesopores (i.e. the total pore volume in the range from 0 to 50 nm) in the range from 0.4 to 2.2 cm$^3$/g. Typically, the conductive porous particle framework includes both micropores and mesopores. It is not excluded that conductive porous particle frameworks may be used which include micropores and no mesopores, or mesopores and no micropores. However, it is preferred that the conductive porous particle framework contains at least some micropores.

More preferably, the total volume of micropores and mesopores in the conductive porous particle framework is at least 0.45 cm$^3$/g, or at least 0.5 cm$^3$/g, at least 0.55 cm$^3$/g, or at least 0.6 cm$^3$/g, or at least 0.65 cm$^3$/g, or at least 0.7 cm$^3$/g, or at least 0.75 cm$^3$/g, or at least 0.8 cm$^3$/g, at least 0.85 cm$^3$/g, or at least 0.9 cm$^3$/g, or at least 0.95 cm$^3$/g, or at least 1 cm$^3$/g. More preferably, the total volume of micropores and mesopores in the conductive porous particle framework is at least 0.7, or at least 0.75, or at least 0.8, or at least 0.85. The use of a high porosity carbon framework is advantageous since it allows a larger amount of silicon to be accommodated within the pore structure, and it has been found that high porosity carbon frameworks in which the pore volume is predominantly in the form of micropores and smaller mesopores have sufficient strength to accommodate the volumetric expansion of the silicon without fracturing or otherwise degrading the porous carbon framework.

The internal pore volume of the conductive porous particle framework is suitably capped at a value at which increasing fragility of the conductive porous particle framework outweighs the advantage of increased pore volume accommodating a larger amount of the electroactive material. Preferably, the total volume of micropores and mesopores in the conductive porous particle framework is no more than 2 cm$^3$/g, or no more than 1.8 cm$^3$/g, or no more than 1.6 cm$^3$/g, or no more than 1.5 cm$^3$/g, or no more than 1.45 cm$^3$/g, or no more than 1.4 cm$^3$/g, or no more than 1.35 cm$^3$/g, or no more than 1.3 cm$^3$/g, or no more than 1.25 cm$^3$/g, or no more than 1.2 cm$^3$/g, or no more than 1.1 cm$^3$/g, or no more than 1.0 cm$^3$/g, or no more than 0.9 cm$^3$/g. More preferably, the total volume of micropores and mesopores in the conductive porous particle framework is no more than 1.2 cm$^3$/g, or no more than 1.1 cm$^3$/g, or no more than 1.0 cm$^3$/g, or no more than 0.9 cm$^3$/g.

In some examples, the total volume of micropores and mesopores in the conductive porous particle framework may be in the range from 0.6 to 1.4 cm$^3$/g, or in the range from 0.65 to 1.4 cm$^3$/g, or in the range from 0.7 to 1.4 cm$^3$/g, or in the range from 0.75 to 1.4 cm$^3$/g or in the range from 0.6 to 1.3 cm$^3$/g, or in the range from 0.65 to 1.3 cm$^3$/g, or in the range from 0.7 to 1.3 cm$^3$/g, or in the range from 0.75 to 1.3 cm$^3$/g, or in the range from 0.6 to 1.2 cm$^3$/g, or in the range from 0.65 to 1.2 cm$^3$/g, or in the range from 0.7 to 1.2 cm$^3$/g, or in the range from 0.75 to 1.2 cm$^3$/g, or in the range from 0.6 to 1 cm$^3$/g, or in the range from 0.65 to 1 cm$^3$/g, or in the range from 0.7 to 1 cm$^3$/g, or in the range from 0.75 to 1 cm$^3$/g, or in the range from 0.6 to 0.9 cm$^3$/g, or in the range from 0.65 to 0.9 cm$^3$/g, or in the range from 0.7 to 0.9 cm$^3$/g, or in the range from 0.75 to 0.9 cm$^3$/g.

The general term "PD$_n$ pore diameter" as used herein refers to the volume-based nth percentile pore diameter, based on the total volume of micropores and mesopores. For instance, the term "PD$_{90}$ pore diameter" as used herein refers to the pore diameter below which 90% of the total micropore and mesopore volume, represented by P$^1$, is found and the PD50 pore diameter is the median pore diameter below which 50% of the total micropore and mesopore volume is found.

The PD$_{90}$ pore diameter of the porous carbon framework may be no more than 20 nm, or no more than 15 nm. Preferably the PD$_{90}$ pore diameter is no more than 12 nm or no more than 10 nm, or no more than 8 nm, or no more than 6 nm. Preferably, the PD$_{90}$ pore diameter of the porous carbon framework is at least 3 nm, or at least 3.2 nm, or at least 3.5 nm, or at least 3.8 nm, or at least 4 nm.

The PD$_{30}$ pore diameter of the porous carbon framework is preferably no more than 1.6 nm, or no more than 1.5 nm, or no more than 1.4 nm, or no more than 1.3 nm, or no more than 1.2 nm, or no more than 1.1 nm, or no more than 1 nm. Preferably, the PD$_{30}$ pore diameter of the porous carbon framework is preferably at least 0.45 nm, or at least 0.5 nm, or at least 0.6 nm, or at least 0.7 nm.

The PD$_{50}$ pore diameter of the conductive porous particle framework is preferably no more than 10 nm, or no more than 8 nm, or no more than 6 nm, or no more than 5 nm, or no more than 4 nm, or no more than 3 nm, or no more than 2.5 nm, or no more than 2 nm, or no more than 1.5 nm.

Preferably, the $PD_{50}$ pore diameter of the porous carbon framework is at least 1 nm, or at least 1.1 nm, or at least 1.2 nm. Therefore, in accordance with the invention, at least 50% of the total volume of micropores and mesopores in the conductive porous particle framework is preferably in the form of pores having a diameter of less than 8 nm.

For the avoidance of doubt, any macropore volume (pore diameter greater than 50 nm) is not taken into account for the purpose of determining $PD_{50}$ values.

The volumetric ratio of micropores to mesopores in the conductive porous particle framework may range in principle from 100:0 to 0:100. Preferably, the volumetric ratio of micropores to mesopores is from 90:10 to 55:45, or from 90:10 to 60:40, or from 85:15 to 65:35.

The pore size distribution of the conductive porous particles may be monomodal, bimodal or multimodal. As used herein, the term "pore size distribution" relates to the distribution of pore size relative to the cumulative total internal pore volume of the conductive porous particles. A bimodal or multimodal pore size distribution may be preferred since close proximity between micropores and pores of larger diameter provides the advantage of efficient ionic transport through the porous network to the silicon.

The total volume of micropores and mesopores and the pore size distribution of micropores and mesopores are determined using nitrogen gas adsorption at 77 K down to a relative pressure $p/p_0$ of $10^{-6}$ using quenched solid density functional theory (QSDFT) in accordance with standard methodology as set out in ISO 15901-2 and ISO 15901-3. Nitrogen gas adsorption is a technique that characterizes the porosity and pore diameter distributions of a porous material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA, and the Autosorb IQ porosity analyzers, which are available from Quantachrome Instruments.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm (i.e. only for micropores and mesopores). $PD_{50}$ are likewise determined relative to the total volume of micropores and mesopores only.

In view of the limitations of available analytical techniques it is not possible to measure pore volumes and pore size distributions across the entire range of micropores, mesopores and macropores using a single technique. In the case that the conductive porous particle framework comprises macropores, the volume of pores having diameter in the range from greater than 50 nm and up to 100 nm may be measured by mercury porosimetry and is preferably no more than 0.3 cm$^3$/g, or no more than 0.20 cm$^3$/g, or no more than 0.1 cm$^3$/g, or no more than 0.05 cm$^3$/g. More preferably, the volume of pores having diameter in the range from greater than 50 nm and up to 100 nm is preferably no more than 20%, or no more than 10%, or no more than 5%, or no more than 2%, or no more than 1%, or no more than 0.5% of the total volume of micropores and mesopores.

A small fraction of macropores may be useful to facilitate electrolyte access into the pore network, but the advantages of the invention are obtained substantially by accommodating silicon in micropores and smaller mesopores.

Any pore volume measured by mercury porosimetry at pore sizes of 50 nm or below is disregarded (as set out above, nitrogen adsorption is used to characterize the mesopores and micropores). Pore volume measured by mercury porosimetry above 100 nm is assumed for the purposes of the invention to be inter-particle porosity and is also disregarded.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension γ taken to be 480 mN/m and the contact angle φ taken to be 140° for mercury at room temperature. The density of mercury is taken to be 13.5462 g/cm$^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology", 1997, Micromeritics Instrument Corporation, ISBN 0-9656783-0.

It will be appreciated that intrusion techniques such as gas adsorption and mercury porosimetry are effective only to determine the pore volume of pores that are accessible to nitrogen or to mercury from the exterior of the conductive porous particle framework. Porosity values specified herein shall be understood as referring to the volume of open pores, i.e. pores that are accessible to a fluid from the exterior of the conductive porous particles. Fully enclosed pores which cannot be identified by nitrogen adsorption or mercury porosimetry shall not be taken into account herein when determining porosity values.

Likewise, any pore volume located in pores that are so small as to be below the limit of detection by nitrogen adsorption is not taken into account.

The conductive porous particle framework is preferably a conductive porous carbon particle framework. The conductive porous carbon particle framework preferably comprises at least 80 wt % carbon, more preferably at least 85 wt % carbon, more preferably at least 90 wt % carbon, more preferably at least 95 wt % carbon, and optionally at least 98 wt % or at least 99 wt % carbon. The carbon may be crystalline carbon or amorphous carbon, or a mixture of amorphous and crystalline carbon. The conductive porous carbon particle framework may be derived from hard carbon porous particles or soft carbon porous particles.

As used herein, the term "hard carbon" refers to a disordered carbon matrix in which carbon atoms are found predominantly in the sp$^2$ hybridised state (trigonal bonds) in nanoscale polyaromatic domains. The polyaromatic domains are cross-linked with chemical bonds, e.g. a C—O—C bond. Due to the chemical cross-linking between the polyaromatic domains, hard carbons cannot be converted to graphite at high temperatures. Hard carbons have graphite-like character as evidenced by the large G-band (~1600 cm$^{-1}$) in the Raman spectrum. However, the carbon is not fully graphitic as evidenced by the significant D-band (~1350 cm$^{-1}$) in the Raman spectrum.

As used herein, the term "soft carbon" also refers to a disordered carbon matrix in which carbon atoms are found predominantly in the sp$^2$ hybridised state (trigonal bonds) in polyaromatic domains having dimensions in the range from 5 to 200 nm. In contrast to hard carbons, the polyaromatic domains in soft carbons are associated by intermolecular forces but are not cross-linked with a chemical bond. This means that they will graphitise at high temperature. The conductive porous carbon particles preferably comprise at least 50% sp$^2$ hybridised carbon as measured by XPS. For example, the conductive porous carbon particles may suitably comprise from 50% to 98% sp$^2$ hybridised carbon, from 55% to 95% sp$^2$ hybridised carbon, from 60% to 90% sp$^2$ hybridised carbon, or from 70% to 85% sp$^2$ hybridised carbon.

A variety of different materials may be used to prepare suitable conductive porous carbon frameworks via pyrolysis. Examples of organic materials that may be used include plant biomass including lignocellulosic materials (such as coconut shells, nut shells, rice husks, wood etc.) and fossil carbon sources such as coal. Examples of resins and polymeric materials which form porous carbon particles on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different carbon materials may be obtained depending on the starting material and the conditions of the pyrolysis process. Porous carbon particles of various different specifications are available from commercial suppliers.

Porous carbon particles may undergo a chemical or gaseous activation process to increase the volume of mesopores and micropores. A suitable activation process comprises contacting pyrolyzed carbon with one or more of oxygen, steam, CO, $CO_2$ and KOH at a temperature in the range from 600 to 1000° C. Mesopores can also be obtained by known templating processes, using extractable pore formers such as MgO and other colloidal or polymer templates which can be removed by thermal or chemical means post pyrolysis or activation.

Alternatives to carbon-based conductive particle frameworks include porous metal oxides, such as oxides of titanium having the formula $TiO_x$ where x has a value greater than 1 and less than 2.

The conductive porous particle framework preferably has a BET surface area of at least 750 m$^2$/g, or at least 1,000 m$^2$/g, or at least 1,250 m$^2$/g, or at least 1,500 m$^2$/g. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. Preferably, the BET surface area of the conductive porous particle framework is no more than 4,000 m$^2$/g, or no more than 3,500 m$^2$/g, or no more than 3,250 m$^2$/g, or no more than 3,000 m$^2$/g. For example the conductive porous particle framework may have a BET surface area of from 750 m$^2$/g to 4,000 m$^2$/g, or from 1,000 m$^2$/g to 3,500 m$^2$/g, or from 1,250 m$^2$/g to 3,250 m$^2$/g or from 1,500 m$^2$/g to 3,000 m$^2$/g.

The electroactive material in the composite particles is preferably selected from silicon, tin, germanium, aluminium and mixtures thereof. A preferred electroactive material is silicon. The electroactive material may optionally be doped, for example with boron or phosphorus, as also discussed in further detail below.

The composite particles may have a range of different electroactive material loadings. For example, the amount of electroactive material in the composite particles may be selected such that at least 20% and as much as 60% or more of the internal pore volume of the conductive porous particle framework is occupied by the electroactive material. For example, the electroactive material may occupy from 25% to 55%, or from 25% to 50%, or from 30% to 45%, or from 30% to 40% of the internal pore volume of the conductive porous particle framework. Within these preferred ranges, the pore volume of the conductive porous carbon particle framework is effective to accommodate expansion of the electroactive material during charging and discharging, but avoids excess pore volume which does not contribute to the volumetric capacity of the core-shell composite particles. However, the amount of electroactive material is also not so high as to impede effective lithiation due to inadequate metal-ion diffusion rates or due to inadequate expansion volume resulting in mechanical resistance to lithiation.

In the case that the electroactive material is silicon, the amount of silicon in the composite particles can be correlated to the available pore volume by the requirement that the mass ratio of silicon to the conductive porous particle framework is in the range from $[0.5 \times P^1$ to $1.3 \times P_1]$: 1, wherein $P_1$ is a dimensionless quantity having the magnitude of the total pore volume of micropores and mesopores in the conductive porous particles, as expressed in cm$^3$/g (e.g. if the porous conductive particle framework has a total volume of micropores and mesopores of 1.2 cm$^3$/g, then $P_1$=1.2). This relationship takes into account the density of silicon and the pore volume of the conductive porous particle framework to define a weight ratio of silicon at which the pore volume is around 20% to 55% occupied.

In the case that the electroactive material is silicon, the amount of silicon in the composite particles, preferably comprise from 0.35 wt % to 0.65 wt % of silicon, or from 0.4 wt % to 0.6 wt % silicon, or from 0.45 wt % to 0.55 wt % silicon.

Preferred composite particles include a conductive carbon porous particle framework, wherein the composite particles comprise at least 80 wt %, or from 80 to 98 wt % in total of silicon and carbon.

The amount of silicon in the composite particles can be determined by elemental analysis. Preferably, elemental analysis is used to determine the weight percentage of carbon (and optionally hydrogen, nitrogen and oxygen) in the porous carbon particles alone and in the silicon-containing composite particles. Determining the weight percentage of carbon in the in the porous carbon particles alone takes account of the possibility that the porous carbon particles contain a minor amount of heteroatom. Both measurements taken together allow the weight percentage of silicon relative to the porous carbon particles to be determined reliably.

The silicon content is preferably determined by ICP-OES (Inductively coupled plasma-optical emission spectrometry). A number of ICP-OES instruments are commercially available, such as the iCAP® 7000 series of ICP-OES analysers available from ThermoFisher Scientific. The carbon content of the composite particles and of the porous carbon particle framework alone (as well as the hydrogen, nitrogen and oxygen content if required) are preferably determined by IR absorption. A suitable instrument for determining carbon, hydrogen, nitrogen and oxygen content is the TruSpec® Micro elemental analyser available from Leco Corporation.

Preferably at least 85 wt %, more preferably at least 90 wt %, more preferably at least 95 wt %, even more preferably at least 98 wt % of the electroactive material mass in the composite particles is located within the internal pore volume of the conductive porous particle framework such that there is no or very little electroactive material located on the external surfaces of the composite particles.

The particulate materials of the invention can be further characterised by their performance under thermogravimetric analysis (TGA) in air. Preferably the particulate material contains no more than 10% unoxidised silicon at 800° C. as determined by TGA in air with a temperature ramp rate of 10° C./min. More preferably the particulate material contains no more than 5% or no more than 2% unoxidised silicon at 800° C. as determined by TGA in air with a temperature ramp rate of 10° C./min.

The determination of the amount of unoxidised silicon is derived from the characteristic TGA trace for these materials. A mass increase at ca. 300-500° C. corresponds to initial oxidation of silicon to $SiO_2$, and is followed by mass loss at ca. 500-600° C. as carbon is oxidised to $CO_2$ gas. Above ca. 600° C., there is a further mass increase corresponding to the continued conversion of silicon to $SiO_2$ which increases toward an asymptotic value above 1000° C. as silicon oxidation goes to completion.

For the purposes of this analysis, it is assumed that any mass increase above 800° C. corresponds to the oxidation of silicon to $SiO_2$ and that the total mass at completion of oxidation is $SiO_2$. This allows the percentage of unoxidised silicon at 800° C. as a proportion of the total amount of silicon to be determined according to the following formula:

$$Z=1.875\times[(M_f-M_{800})/M_f]\times100\%$$

Wherein Z is the percentage of unoxidized silicon at 800° C., $M_f$ is the mass of the sample at completion of oxidation at 1400° C. and $M_{800}$ is the mass of the sample at 800° C. For the purposes of this analysis, it is assumed that any mass increase above 800° C. corresponds to the oxidation of silicon to $SiO_2$ and that the total mass at completion of oxidation is $SiO_2$. For completeness, it will be understood that 1.875 is the molar mass ratio of $SiO_2$ to $O_2$ (i.e. the mass ratio of $SiO_2$ formed to the mass increase due to the addition of oxygen).

Without being bound by theory, it is understood that the temperature at which silicon is oxidised under TGA corresponds broadly to the length scale of the oxide coating on the silicon due to diffusion of oxygen atoms through the oxide layer being thermally activated. The size of the silicon nanostructure and its location limit the length scale of the oxide coating thickness. Therefore it is understood that silicon deposited in micropores and mesopores will oxidise at a lower temperature than deposits of silicon on a particle surface due to the necessarily thinner oxide coating existing on these structures. Accordingly, preferred materials according to the invention exhibit substantially complete oxidation of silicon at low temperatures consistent with the small length scale of silicon nanostructures that are located in micropores and smaller mesopores. For the purposes of the invention, silicon oxidation at 800° C. is assumed to be silicon on the external surfaces of the conductive porous particle framework.

Preferably, the value of Z is no more than 10 wt %, or no more than 8 wt %, or no more than 6 wt %, or no more than 5 wt %.

The composite particles preferably have a low total oxygen content. Oxygen may be present in the composite particles for instance as part of the conductive porous particle framework or as an oxide layer on any exposed silicon surfaces. Preferably, the surfaces of the electroactive material are passivated so as to inhibit or prevent oxide formation.

Preferably, the total oxygen content of the composite particles is less than 15 wt %, more preferably less than 10 wt %, more preferably less than 5 wt %, for example less than 2 wt %, or less than 1 wt %, or less than 0.5 wt %. In the case that the filler material is a solid electrolyte material that contains oxygen, the total oxygen content of the composite particles is preferably less than 25 wt %, or less than 20 wt %, more preferably less than 15 wt %, for example less than 12 wt %, or less than 10 wt %.

The lithium-ion permeable filler material may be selected from any material which allows the transport of lithium ions but which is preferably impermeable to solvent molecules, such as the solvents of liquid electrolytes. Preferably, the lithium-ion permeable filler material is electrochemically stable at <0.1 V vs. $Li/Li^+$.

Optionally, the lithium-ion permeable filler material may be a conductive pyrolytic carbon material. A conductive pyrolytic carbon filler may be obtained by heating precursor composite particles (comprising the conductive porous particle framework and the electroactive material) in the presence of a suitable pyrolytic carbon precursor vapour as discussed in further detail below. The conductive pyrolytic carbon filler may optionally be doped, for example with boron or phosphorus, as also discussed in further detail below. Optionally, both the conductive pyrolytic carbon filler and the electroactive material may be doped for example both may be doped with boron or both may be doped with phosphorus, or a mixture of boron and phosphorus dopants may be used.

Optionally, the conductive pyrolytic carbon material is an amorphous carbon material in which carbon atoms are found predominantly in the $sp^2$ hybridised state (trigonal bonds) in polyaromatic domains having dimensions in the range of 5-200 nm. The conductive pyrolytic carbon material preferably comprises at least 50% $sp^2$ hybridised carbon as measured by XPS. For example, the porous carbon framework may suitably comprise from 50% to 98% $sp^2$ hybridised carbon, from 55% to 95% $sp^2$ hybridised carbon, from 60% to 90% $sp^2$ hybridised carbon, or from 70% to 85% $sp^2$ hybridised carbon.

Alternatively, the lithium-ion permeable filler material may be a lithium-ion permeable solid electrolyte. Examples of suitable lithium permeable solid electrolytes include: garnet-type solid electrolytes (including "LLZO" electrolytes such as $Li_7La_3Zr_2O_{12}$ and $Li_{6.5}La_3Ti_{0.5}Zr_{1.5}O_{12}$); perovskite-type solid electrolytes (including "LLTO" electrolytes such as $Li_{0.33}La_{0.57}TiO_3$); LISICON-type solid electrolytes, NaSICON-type solid electrolytes (such as $Li_{1.3}Al_{0.3}Ti_{1.7}(PO_4)_3$); lithium phosphorous oxy-nitride (LiPON) solid electrolytes; $Li_3N$-type solid electrolytes; lithium phosphate ($Li_3PO_4$) solid electrolytes, lithium titanate ($Li_4Ti_5O_{12}$) solid electrolytes; lithium tantalate ($LiTaO_3$) solid electrolytes; sulfide-type solid electrolytes; argyrodite-type solid electrolytes; and anti-perovskite-type solid electrolytes. Variants (e.g. including dopants) and combinations of these electrolyte types are also included.

The lithium-ion permeable solid electrolyte may also form a coating over at least a portion of the outer surface of the porous carbon framework.

Alternatively the lithium-ion permeable filler material may be a metal-oligomer filler material. As used herein, the term "metal-oligomer filler" refers to a filler that is composed of an extended network of metal and/or semi-metal atoms that are interlinked by non-metal elements such as oxygen and/or nitrogen. This type of filler material is suitably formed via a wet-chemical method using sol-gel chemistry followed by crystallisation of the resulting gel to form a dense cross-linked network, e.g. an oxide, nitride or oxynitride network. For example, the metal-oligomer filler material may be a cross-linked metal-oligomer network comprising an oxide, nitride or oxynitride of titanium, vanadium chromium, manganese, iron, cobalt, nickel, copper, zinc, aluminium, silicon, gallium or germanium, or a mixture thereof.

The use of electronically conductive fillers is particularly advantageous since it improves the rate performance of the composite particles when used as electroactive materials in lithium-ion batteries. The rate performance of the composite particles is determined at least in part by the rate of lithium ion migration from an electrolyte into the bulk of the composite particles, prior to insertion into the nanoscale electroactive material domains. The use of a lithium-ion permeable solid electrolyte is advantageous since it may act as a rapid-transport system into the bulk of the composite particles during charging of a lithium-ion battery. A conductive pyrolytic carbon material is similarly advantageous since it improves electronic transport into and out of the bulk of the composite particles. This again helps to improve the rate performance of the composite particles.

The composite particles preferably have a $D_{50}$ particle diameter in the range from 1 to 30 µm. Optionally, the $D_{50}$ particle diameter of the composite particles may be at least 1.5 µm, or at least 2 µm, or at least 2.5 µm, or at least 3 µm, or at least 4 µm, or at least 5 µm. Preferably, the $D_{50}$ particle diameter of the composite particles is at least 2.5 µm, or at least 3 µm. Optionally the $D_{50}$ particle diameter of the composite particles may be no more than 25 µm, or no more than 20 µm, or no more than 18 µm, or no more than 15 µm, or no more than 12 µm, or no more than 10 µm, or no more than 8 µm, or no more than 7 µm, or no more than 6 µm, or no more than 5 µm. Preferably, the $D_{50}$ particle diameter of the composite particles is no more than 10 µm, or no more than 8 µm, or no more than 7 µm, or no more than 6 µm, or no more than 5 µm.

For instance, the composite particles may have a $D_{50}$ particle diameter in the range from 1 to 25 µm, or from 1 to 20 µm, or from 1 to 15 µm, or from or from 1 to 10 µm, or from 1 to 8 µm, or from 2 to 20 µm, or from 2 to 15 µm, or from 2 to 10 µm, or from 2 to 8 µm, or from 2 to 6 µm, or from 3 to 15 µm, or from 3 to 10 µm, or from 3 to 8 µm, or from 3 to 6 µm, or from 3 to 5 µm or from 4 to 12 µm, or from 4 to 10 µm, or from 4 to 8 µm or from 4 to 6 µm.

Particles within these size ranges and having porosity and a pore diameter distribution as set out herein are ideally suited for the preparation of composite particles for use in anodes for metal-ion batteries by a fluidized bed process. Not only do these particles provides good fluidization properties throughout the deposition process, but the composite particles thus formed have good dispersibility in slurries, structural robustness, high capacity retention over repeated charge-discharge cycles, and are suitable for forming dense electrode layers of uniform thickness in the conventional thickness range from 20 to 50 µm.

The $D_{10}$ particle diameter of the composite particles is preferably at least 0.5 µm, or at least 0.8 µm, or at least 1 µm, or at least 1.5 µm, or at least 2 µm. By maintaining the $D_{10}$ particle diameter at 0.5 µm or more, the potential for undesirable agglomeration of sub-micron sized particles is reduced, resulting in improved dispersibility of the composite particles in slurries used for electrode manufacture.

The $D_{90}$ particle diameter of the composite particles is preferably no more than 40 µm, or no more than 30 µm, or no more than 25 µm, or no more than 20 µm, or no more than 15 µm. The use of larger conductive porous particles as the starting material complicates separation of the composite particles from the particulate additive. It also results in non-uniform forming packing of the composite particles in electrode active layers, thus disrupting the formation of dense electrode layers, particularly electrode layers having a thickness in the range from 20 to 50 µm.

More preferably, the $D_{98}$ particle diameter of the conductive porous particles is no more than 40 µm, or no more than 30 µm, or no more than 25 µm, or no more than 20 µm.

The composite particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles into dense electrode layers is more readily achievable.

For the avoidance of doubt, the term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

Particle diameters and particle size distributions can be determined by standard laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in distilled water. The particle refractive index is taken to be 3.50 and the dispersant index is taken to be 1.330. Particle size distributions are calculated using the Mie scattering model.

The composite particles preferably have a BET surface area of no more than 200 $m^2/g$, or no more than 150 $m^2/g$, or no more than 100 $m^2/g$, or no more than 80 $m^2/g$, or no more than 60 $m^2/g$, or no more than 40 $m^2/g$, or no more than 30 $m^2/g$, or no more than 25 $m^2/g$, or no more than 20 $m^2/g$, or no more than 15 $m^2/g$, or no more than 10 $m^2/g$. In general, a low BET surface area is preferred in order to minimize the formation of solid electrolyte interphase (SEI) layers at the surface of the composite particles during the first charge-discharge cycle of an anode. However, a BET surface area which is excessively low results in unacceptably low charging rate and capacity due to the inaccessibility of the bulk of the electroactive material to metal ions in the surrounding electrolyte. For instance, the BET surface area of the composite particles is preferably at least 0.1 $m^2/g$, or at least 1 $m^2/g$, or at least 2 $m^2/g$, or at least 5 $m^2/g$. For instance, the BET surface area may be in the range from 1 $m^2/g$ to 25 $m^2/g$, more preferably in the range from 2 to 15 $m^2/g$.

The measurable volume of micropores and mesopores of the composite particles (i.e. in the presence of the electroactive material and the lithium-ion permeable filler) is significantly less than the total pore volume of the conductive porous particle framework, due to occupancy of the pores. Preferably, the total measurable volume of micropores and mesopores of the composite particles, as measured by nitrogen gas adsorption, is no more than $(0.15 \times P^1)$ $cm^3/g$, or no more than $(0.10 \times P^1)$ $cm^3/g$, or no more than $(0.05 \times P^1)$ $cm^3/g$, or no more than $(0.02 \times P^1)$ $cm^3/g$, or no more than $(0.01 \times P^1)$ $cm^3/g$, wherein $P^1$ is as defined above.

The composite particles may optionally include a conductive coating which is different from the lithium-ion permeable filler material. For instance, the conductive coating may be a conductive carbon coating. A conductive carbon coating may be used with a composite particle comprising a lithium-ion permeable solid electrolyte as the filler material. Alternatively, in the case that the filler material is a conductive pyrolytic carbon filler material, the conductive carbon coating may be a different type of conductive pyrolytic carbon to the filler material, for example it may be formed from different carbon-containing precursors.

Suitably a conductive carbon coating may be obtained by a chemical vapour deposition (CVD) method. The thickness of the carbon coating may suitably be in the range from 2 to 30 nm. Optionally, the carbon coating may be porous and/or may only cover partially the surface of the composite particles.

A carbon coating has the advantages that it further reduces the BET surface area of the particulate material by smoothing any surface defects and by filling any remaining surface microporosity, thereby further reducing first cycle loss. In addition, a carbon coating improves the conductivity of the surface of the composite particles, reducing the need for conductive additives in the electrode composition, and also creates an optimum surface for the formation of a stable SEI layer, resulting in improved capacity retention on cycling. Further enhancement of conductivity can be obtained by incorporating a dopant (such as a boron or phosphorus dopant) into the carbon coating. Suitable dopants are discussed in further detail below.

The particulate material of the invention preferably has a specific charge capacity on first lithiation of 1200 to 2340 mAh/g. Preferably, silicon-containing particulate materials according to the invention have a specific charge capacity on first lithiation of at least 1400 mAh/g.

In a second aspect of the invention, there is provided a process for preparing a particulate material, the process comprising:
(a) providing a plurality of conductive porous particles comprising micropores and/or mesopores, wherein the micropores and/or mesopores have a total pore volume in the range from 0.4 to 2.2 $cm^3/g$;
(b) depositing an electroactive material selected from silicon, tin, aluminium, germanium and alloys thereof into the micropores and/or mesopores of the porous carbon frameworks using a chemical vapour infiltration process, wherein the deposited electroactive material partially occupies the pore volume of the conductive porous particles;
(c) depositing a lithium-ion permeable filler material into some or all of the remaining pore volume of the conductive porous particles.

The process of the invention therefore provides composite particles as described above, wherein the conductive porous particles form a framework for an electroactive material and for a lithium-ion permeable filler.

A particular advantage of the process of the invention is that it allows for the use of a conductive porous particles having porosity above that which is required in the final product. By filling the residual pore volume with the lithium-ion permeable filler, the final effective occupancy of the pore volume by the electroactive material is equivalent to that which would be obtained by using porous particles of lower porosity without a filler, while the surface area of the composite particles is also reduced. Obtaining a relatively higher degree of occupancy of a low porosity material requires the CVI conditions to be controlled to favour a low deposition rate of the electroactive material, resulting in low manufacturing throughput. The process of the invention allows for CVI conditions that favour an increased deposition rate while the CVI process is stopped before high occupancy of the pore volume is obtained. This allows for increased process control and higher throughput. The use of ionically- or electronically-conductive materials as the lithium-ion permeable filler provides further advantages in respect. The invention therefore provides a process which allows these composite materials to be prepared on a scale which is suitable for commercial manufacture and which provides a high quality product with uniformity of composition and performance.

In accordance with the second aspect of the invention, the conductive porous particles used in step (a) form the conductive porous particle framework in the particles of the first aspect of the invention. Therefore, the conductive porous particles in step (a) may have any of the properties described above with regard to the conductive porous particle framework in the first aspect of the invention. The conductive porous particles in step (a) are therefore to be considered equivalent to the conductive porous particle framework in the composite particles described above and any and all properties of the conductive porous particle framework described herein shall be regarded as applying to the conductive porous particles in the second aspect of the invention.

Thus, the conductive porous particles comprise a three-dimensionally interconnected open pore network comprising micropores and/or mesopores and optionally a minor volume of macropores.

The total volume of micropores and mesopores in the conductive porous particles is preferably at least 0.45 $cm^3/g$, or at least 0.5 $cm^3/g$, at least 0.55 $cm^3/g$, or at least 0.6 $cm^3/g$, or at least 0.65 $cm^3/g$, or at least 0.7 $cm^3/g$, or at least 0.75 cm³/g, or at least 0.8 cm³/g, at least 0.85 cm³/g, or at least 0.9 cm³/g, or at least 0.95 cm³/g, or at least 1 cm³/g. More preferably, the total volume of micropores and mesopores in the conductive porous particle framework is at least 0.7 cm³/g, or at least 0.75 cm³/g, or at least 0.8 cm³/g, or at least 0.85 cm³/g.

Preferably, the total volume of micropores and mesopores in the conductive porous particles is no more than 2 cm³/g, or no more than 1.8 cm³/g, or no more than 1.6 cm³/g, or no more than 1.5 cm³/g, or no more than 1.45 cm³/g, or no more than 1.4 cm³/g, or no more than 1.35 cm³/g, or no more than 1.3 cm³/g, or no more than 1.25 cm³/g, or no more than 1.2 cm³/g, or no more than 1.1 cm³/g, or no more than 1.0 cm³/g, or no more than 0.9 cm³/g. More preferably, the total volume of micropores and mesopores in the conductive porous particles is no more than 1.2 cm³/g, or no more than 1.1 cm³/g, or no more than 1.0 cm³/g, or no more than 0.9 cm³/g.

In some examples, the total volume of micropores and mesopores in the conductive porous particles may be in the range from 0.6 to 1.4, or in the range from 0.65 to 1.4, or in the range from 0.7 to 1.4, or in the range from 0.75 to 1.4 or in the range from 0.6 to 1.3, or in the range from 0.65 to 1.3, or in the range from 0.7 to 1.3, or in the range from 0.75 to 1.3 or in the range from 0.6 to 1.2, or in the range from 0.65 to 1.2, or in the range from 0.7 to 1.2, or in the range from 0.75 to 1.2, or in the range from 0.6 to 1, or in the range from 0.65 to 1, or in the range from 0.7 to 1, or in the range from 0.75 to 1, or in the range from 0.6 to 0.9, or in the range from 0.65 to 0.9, or in the range from 0.7 to 0.9, or in the range from 0.75 to 0.9.

The $PD_{50}$ pore diameter of the conductive porous particles is preferably no more than 10 nm, or no more than 8 nm, or no more than 6 nm, or no more than 5 nm, or no more than 4 nm, or no more than 3 nm, or no more than 2.5 nm, or no more than 2 nm, or no more than 1.5 nm.

The volumetric ratio of micropores to mesopores in the conductive porous particles may range in principle from 100:0 to 0:100. Preferably, the volumetric ratio of micropores to mesopores is from 90:10 to 55:45, or from 90:10 to 60:40, or from 85:25 to 65:35.

The pore size distribution of the conductive porous particles may be monomodal, bimodal or multimodal.

In the case that the conductive porous particles comprise macropores, the volume of pores having diameter in the range from greater than 50 nm and up to 100 nm may be measured by mercury porosimetry and is preferably no more than 0.3 cm³/g, or no more than 0.20 cm³/g, or no more than 0.1 cm³/g, or no more than 0.05 cm³/g. More preferably, the volume of pores having diameter in the range from greater than 50 nm and up to 100 nm is preferably no more than 20%, or no more than 10%, or no more than 5%, or no more than 2%, or no more than 1%, or no more than 0.5% of the total volume of micropores and mesopores.

The conductive porous particles are preferably porous carbon particles as defined above with respect to the conductive porous particle framework of the first aspect of the invention.

The conductive porous particles preferably have a BET surface area of at least 750 m²/g, or at least 1,000 m²/g, or at least 1,250 m²/g, or at least 1,500 m²/g. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. Preferably, the BET surface area of the conductive porous particles is no more than 4,000 m²/g, or no more than 3,500 m²/g, or no more than 3,250 m²/g, or no more than 3,000 m²/g.

The conductive porous preferably have a $D_{50}$ particle diameter in the range from 1 to 30 µm. Optionally, the $D_{50}$ particle diameter of the composite particles may be at least 1.5 µm, or at least 2 µm, or at least 2.5 µm, or at least 3 µm, or at least 4 µm, or at least 5 µm. Preferably, the $D_{50}$ particle diameter of the conductive porous particles is at least 2.5 µm, or at least 3 µm. Optionally the $D_{50}$ particle diameter of the conductive porous particles may be no more than 25 µm, or no more than 20 µm, or no more than 18 µm, or no more than 15 µm, or no more than 12 µm, or no more than 10 µm, or no more than 8 µm, or no more than 7 µm, or no more than 6 µm, or no more than 5 µm. Preferably, the $D_{50}$ particle diameter of the conductive porous particles is no more than 10 µm, or no more than 8 µm, or no more than 7 µm, or no more than 6 µm, or no more than 5 µm.

For instance, the conductive porous particles may have a $D_{50}$ particle diameter in the range from 1 to 25 µm, or from 1 to 20 µm, or from 1 to 15 µm, or from or from 1 to 10 µm, or from 1 to 8 µm, or from 2 to 20 µm, or from 2 to 15 µm, or from 2 to 10 µm, or from 2 to 8 µm, or from 2 to 6 µm, or from 3 to 15 µm, or from 3 to 10 µm, or from 3 to 8 µm, or from 3 to 6 µm, or from 3 to 5 µm, or from 4 to 12 µm, or from 4 to 10 µm, or from 4 to 8 µm or from 4 to 6 µm.

The $D_{10}$ particle diameter of the conductive porous particles is preferably at least 0.5 µm, or at least 0.8 µm, or at least 1 µm, or at least 1.5 µm, or at least 2 µm.

The $D_{90}$ particle diameter of the conductive porous particles is preferably no more than 40 µm, or no more than 30 µm, or no more than 25 µm, or no more than 20 µm, or no more than 15 µm.

The conductive porous particles preferably have a BET surface area of at least 750 m²/g, or at least 1,000 m²/g, or at least 1,250 m²/g, or at least 1,500 m²/g. Preferably, the BET surface area of the conductive porous particles is no more than 4,000 m²/g, or no more than 3,500 m²/g, or no more than 3,250 m²/g, or no more than 3,000 m²/g.

Step (b) of the process of the invention uses chemical vapour infiltration (CVI) of a precursor of an electroactive material into the pore structure of the porous carbon framework.

Chemical vapour infiltration (CVI) is a process of infiltrating a porous material with an additional phase, typically by passing a mixture of carrier gases and a reactive gaseous precursor through the porous substrate at high temperature. Decomposition/reaction of the reactive gaseous precursor on pore surfaces results in the deposition of a solid phase in the pore structure.

The electroactive material deposited in step (b) is preferably selected from silicon, tin, germanium, aluminium and mixtures thereof. A preferred electroactive material is silicon.

Suitable gaseous precursors for the deposition of silicon include silane ($SiH_4$) and trichlorosilane ($SiHCl_3$). CVI is of particular utility for preparing the electroactive materials disclosed herein since it results in very little damage to the geometry of the porous substrate.

Suitable silicon-containing precursors include silane ($SiH_4$), disilane ($Si_2H_6$), trisilane ($Si_3H_8$), tetrasilane ($Si_4H_{10}$), or chlorosilanes such as trichlorosilane ($HSiCl_3$) or methylchlorosilanes such as methyltrichlorosilane ($CH_3SiCl_3$) or dimethyldichlorosilane ($(CH_3)_2SiCl_2$). Preferably the silicon-containing precursor is silane.

Suitable tin-containing precursors include bis[bis(trimethylsilyl)amino]tin(II) ($[[(CH_3)_3Si]_2N]_2Sn$), tetraallyltin ((H$_2$C=CHCH$_2$)$_4$Sn), tetrakis(diethylamido)tin(IV) ([(C$_2$H$_5$)$_2$N]$_4$Sn), tetrakis(dimethylamido)tin(IV) ([(CH$_3$)$_2$N]$_4$Sn), tetramethyltin (Sn(CH$_3$)$_4$), tetravinyltin (Sn(CH=CH$_2$)$_4$), tin(II) acetylacetonate (C$_{10}$H$_{14}$O$_4$Sn), trimethyl(phenylethynyl)tin (C$_6$H$_5$C≡CSn(CH$_3$)$_3$), and trimethyl(phenyl)tin (C$_6$H$_5$Sn(CH$_3$)$_3$) Preferably the tin-containing precursor is tetramethyltin.

Suitable aluminium-containing precursors include aluminium tris(2,2,6,6-tetramethyl-3,5-heptanedionate) (Al(OCC(CH$_3$)$_3$CHCOC(CH$_3$)$_3$)$_3$), trimethylaluminium ((CH$_3$)$_3$Al), and tris(dimethylamido)aluminium(III) (Al(N(CH$_3$)$_2$)$_3$). Preferably the aluminium-containing precursor is trimethylaluminium.

Suitable germanium-containing precursors include germane (GeH$_4$), hexamethyldigermanium ((CH$_3$)$_3$GeGe(CH$_3$)$_3$), tetramethylgermanium ((CH$_3$)$_4$Ge), tributylgermanium hydride ([CH$_3$(CH$_2$)$_3$]$_3$GeH), triethylgermanium hydride ((C$_2$H$_5$)$_3$GeH), and triphenylgermanium hydride ((C$_6$H$_5$)$_3$GeH). Preferably the germanium-containing precursor is germane.

The CVI process may also utilise a gaseous precursor of a dopant material to deposit a doped electroactive material into the micropores and/or mesopores of the porous carbon frameworks. When the dopant is boron suitable precursors include borane (BH$_3$), diborane (B$_2$H$_6$), triisopropyl borate ([(CH$_3$)$_2$CHO]$_3$B), triphenylborane ((C$_6$H$_5$)$_3$B), and tris(pentafluorophenyl)borane (C$_6$F$_5$)$_3$B, preferably borane. When the dopant is phosphorus a suitable precursor is phosphine (PH$_3$).

The precursors may be used either in pure form or more usually as a diluted mixture with an inert carrier gas, such as nitrogen or argon. For instance, the precursor may be used in an amount in the range from 0.5-20 vol %, or 1-10 vol %, or 1-5 vol % based on the total volume of the precursor and the inert carrier gas. The CVI process is suitably carried out at low partial pressure of gaseous precursor with total pressure at or close to 101.3 kPa (i.e. at atmospheric pressure, 1 atm), the remaining partial pressure made up to atmospheric pressure using an inert padding gas such as hydrogen, nitrogen or argon. The presence of oxygen should be minimised to prevent undesired oxidation of the deposited electroactive material, in accordance with conventional procedures for working in an inert atmosphere. Preferably, the oxygen content is less than 0.01 vol %, more preferably less than 0.001 vol % based on the total volume of gas used in step (b).

The temperature of the CVI process is suitably chosen to pyrolyse the precursor to the electroactive material. The CVI process is suitably performed at temperature in the range of 200-800° C., or 400-700° C., or 400-600° C., or 400 to 550° C., or 450-550° C., or 450-500° C. Preferably the CVI process is performed at a temperature in the range of 400-500° C., preferably 450-500° C.

The lithium-ion permeable filler material may be a conductive pyrolytic carbon material. A conductive pyrolytic carbon material may be deposited in step (c) by a similar CVI process as is used in step (b). Once sufficient electroactive material has been deposited by CVI in step (b), the precursor vapour of the electroactive material may be substituted by a suitable pyrolytic carbon precursor, optionally with an increase in the reaction temperature. For example, the CVI of a pyrolytic carbon filler in step (c) may be conducted at a temperature of up to 700° C., or no more than 690° C. or no more than 680° C., or no more than 670° C. or no more than 660° C., or no more than 650° C., or no more than 640° C., or no more than 620° C., or no more than 600° C. The minimum temperature in step (c) will depend on the type of carbon precursor that is used. Preferably, the temperature in step (c) is at least 300° C., such as at least 500° C., or at least 520° C., or at least 540° C., or at least 560° C., or at least 580° C.

Suitable hydrocarbons include polycyclic hydrocarbons comprising from 10 to 25 carbon atoms and optionally from 1 to 3 heteroatoms, optionally wherein the polyaromatic hydrocarbon is selected from naphthalene, substituted naphthalenes such as di-hydroxynaphthalene, anthracene, tetracene, pentacene, fluorene, acenapthene, phenanthrene, fluoranthrene, pyrene, chrysene, perylene, coronene, fluorenone, anthraquinone, anthrone and alkyl-substituted derivatives thereof. Suitable pyrolytic carbon precursors also include bicyclic monoterpenoids, optionally wherein the bicyclic monoterpenoid is selected from camphor, borneol, eucalyptol, camphene, careen, sabinene, thujene and pinene. Further suitable pyrolytic carbon precursors include C$_2$-C$_{10}$ hydrocarbons, optionally wherein the hydrocarbons are selected from alkanes, alkenes, alkynes, cycloalkanes, cycloalkenes, and arenes, for example methane, ethylene, propylene, limonene, styrene, cyclohexane, cyclohexene, α-terpinene and acetylene. Other suitable pyrolytic carbon precursors include phthalocyanine, sucrose, starches, graphene oxide, reduced graphene oxide, pyrenes, perhydropyrene, triphenylene, tetracene, benzopyrene, perylenes, coronene, and chrysene. A preferred carbon precursor is acetylene.

A conductive pyrolytic carbon material may be deposited in step (c) by using a pyrolytic carbon precursor together with a gaseous precursor of a dopant material to deposit a doped pyrolytic carbon filler. Doping of the pyrolytic carbon coating will further enhance the conductivity of the filler. When the dopant is boron suitable precursors include borane (BH$_3$), diborane (B$_2$H$_6$), triisopropyl borate ([(CH$_3$)$_2$CHO]$_3$B), triphenylborane ((C$_6$H$_5$)$_3$B), and tris(pentafluorophenyl)borane (C$_6$F$_5$)$_3$B, preferably diborane. When the dopant is phosphorus a suitable precursor is phosphine (PH$_3$). The gaseous dopant precursor is typically incorporated in an amount up to 5 wt % based on the total mass of pyrolytic carbon precursor and gaseous dopant precursor.

The lithium-ion permeable filler material may be a lithium-ion permeable solid electrolyte. A lithium-ion permeable solid electrolyte may be deposited in step (c) by a similar CVI process as is used in step (b). For example, a lithium phosphate solid electrolyte may be deposited in step (c) by the use of an atmosphere of tert-butyllithium and trimethylphosphate. The CVI of a lithium-ion permeable solid electrolyte in step (c) may suitably be carried out at a temperature of up to 700° C., or no more than 650° C., or no more than 600° C. or no more than 550° C., or no more than 500° C. The minimum temperature in step (c) will depend on the type of a lithium-ion permeable solid electrolyte that is used. Preferably, the temperature in step (c) is at least 300° C., or at least 350° C., or at least 400° C., or at least 450° C. For example, the temperature in step (c) may be in the range of 400-500° C.

As in step (b), the gaseous precursors used in step (c) may be used in pure form, or diluted mixture with an inert carrier gas, such as nitrogen or argon. For instance, the precursor may be used in an amount in the range from 0.5-20 vol %, or 1-10 vol %, or 1-5 vol % based on the total volume of the precursor and the inert carrier gas. Step (c) is suitably carried out at low partial pressure of gaseous precursor with total pressure at or close to 101.3 kPa (i.e. at atmospheric pressure, 1 atm), the remaining partial pressure made up to atmospheric pressure using an inert gas. The presence of oxygen should again be minimised to prevent undesired oxidation of the deposited electroactive material. Preferably, the oxygen content is less than 0.01 vol %, more preferably less than 0.001 vol % based on the total volume of gas used in step (c).

A metal-oligomer filler material may be deposited in step (c) using a sol-gel process. A suitable process involves hydrolysis and/or ammonolysis of a metal salt (e.g. an alkoxide, halides or nitrate salt) in an aqueous solution or ammonia solution to form a liquid sol. The material from step (b) in combined with the liquid sol such that the sol penetrates the unoccupied pore volume of the porous carbon particles via incipient wetness impregnation or diffusion. Aging of the sol results in polycondensation of the sol to form a gel. Removal of solvent and thermal annealing results in crystallisation and the formation of a dense, extended cross-linked oxide, nitride or oxynitride network.

Examples of suitable metal salts include alkoxides, halides and nitrates of titanium, vanadium chromium, manganese, iron, cobalt, nickel, copper, zinc, aluminium, silicon, gallium or germanium, or a mixture thereof. Preferably, the crystallisation is carried out at a temperature of less than 700° C., more preferably less than 600° C., for example less than 500° C.

The surfaces of electroactive materials deposited by CVI are reactive to oxygen and form an native oxide layer when exposed to atmospheric oxygen. In the case of silicon, an amorphous silicon dioxide film is formed immediately when a silicon surface is exposed to oxygen. The formation of the native oxide layer is exothermic and therefore requires careful process control to prevent overheating or even combustion of the particulate material during manufacture. The presence of a native oxide layer is associated with irreversible capacity loss and reduced cycle life, and so may be deleterious to the performance of the electroactive materials in lithium-ion batteries. It is therefore preferred that the electroactive material is not exposed to oxygen prior to deposition of the lithium-ion permeable filler material.

More preferably, step (b) of the process of the invention further comprises a further step (b2) of contacting the surface of the deposited electroactive material with a passivating agent, wherein the electroactive material is not exposed to oxygen prior to contact with the passivating agent. A passivating agent is defined herein as a compound that is capable of modifying the surface of the electroactive material in such a way as to inhibit or prevent the formation of surface oxides.

Suitable passivating agents include compounds comprising an alkene, alkyne or carbonyl functional group, more preferably a terminal alkene, terminal alkyne or aldehyde group.

Preferred passivating agents include one or more compounds of the formulae:

R—CH═CH—R; (i)

R—C≡C—R; (ii)

O═CH—R; and (iii)

wherein R represents H or an unsubstituted or substituted aliphatic or aromatic hydrocarbyl group having from 1 to 20 carbon atoms, preferably from 2 to 10 carbon atoms, or wherein two R groups in formula (i) form an unsubstituted or substituted hydrocarbyl ring structure comprising from 3 to 8 carbon atoms. Particularly preferred passivating agents include one or more compounds of the formulae:

CH₂═CH—R; and (i)

HC≡C—R; (ii)

wherein R is as defined above. Preferably R is unsubstituted.

Examples of suitable compounds include ethylene, propylene, 1-butene, butadiene, 1-pentene, 1,4-pentadiene, 1-hexene, 1-octene, styrene, divinylbenzene, acetylene, phenylacetylene, norbornene, norbornadiene and bicyclo[2.2.2]oct-2-ene. Mixtures of different passivating agents may also be used.

It is understood that the alkene, alkyne or carbonyl group of the passivating agent undergoes an insertion reaction with M-H groups at the surface of the electroactive material (where M represents an atom of the electroactive material) to form a covalently passivated surface which is resistant to oxidation by air. When silicon is the electroactive material, the passivation reaction between the silicon surface and the passivating agent may be understood as a form of hydrosilylation, as shown schematically below.

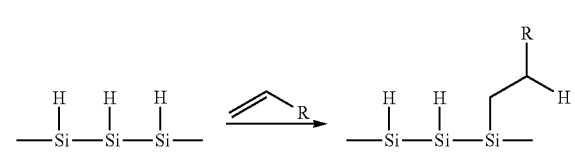

Other suitable passivating agents include compounds including an active hydrogen atom bonded to oxygen, nitrogen, sulphur or phosphorus. For example, the passivating agent may be an alcohol, amine, thiol or phosphine. Reaction of the group —XH with hydride groups at the surface of the electroactive material is understood to result in elimination of $H_2$ and the formation of a direct bond between X and the electroactive material surface.

Suitable passivating agents in this category include compounds of the formula HX-R, wherein X represents O, S, NR or PR, and wherein each R is independently as defined above. Two R groups in formula (iv) may also form an unsubstituted or substituted hydrocarbyl ring structure comprising from 3 to 8 carbon atoms. Preferably X represents O or NH and R represents an optionally substituted aliphatic or aromatic group having from 2 to 10 carbon atoms. Amine groups may also be incorporated into a 4-10 membered aliphatic or aromatic ring structure, as in pyrrolidine, pyrrole, imidazole, piperazine, indole, or purine.

Contacting of the electroactive material with the passivating agent in step (b2) may be carried out at a temperature in the range of 25-700° C. For example, step (b2) may suitably be carried out within the preferred temperature ranges for step (b) and/or step (c) as set out here in. Preferably, step (c) is carried out at the same temperature as step (b2) or at a higher temperature than step (b2). For example, step (b2) may be carried out at a temperature in the range of from 25° C. to less than 500° C., and step (c) may be carried out at a temperature in the range of from 500-700° C.

Following passivation of the electroactive material surface, the lithium-ion permeable filler material may be deposited in step (c) as described above. The R group of the passivating agents defined above may be incorporated into the lithium ion permeable filler so as to form a covalent bond between the lithium ion permeable filler and the surface of the electroactive material via the passivating agent.

In the case that the lithium-ion permeable filler material is a conductive pyrolytic carbon material, the same compound may function as both the passivating agent and the pyrolytic carbon precursor. For example, if styrene is selected as the pyrolytic carbon precursor, then it will also function as a passivating agent provided that the electroactive material is not exposed to oxygen prior to contact with styrene. Therefore, step (c) may comprise may comprise depositing a conductive pyrolytic carbon material by a CVI process, wherein the pyrolytic carbon precursor is the same as the passivating agent used in step (b2). In this case, passivation in step (b2) and deposition of the conductive carbon material in step (c) may be carried out simultaneously, for example at a temperature in the range of from 500-700° C. Alternatively, passivation in step (b2) and deposition of the conductive carbon material in step (c) may be carried out sequentially, with the same material as the passivating agent and the pyrolytic carbon precursor, but wherein step (c) is carried out at a higher temperature than step (b2). For example, step (b2) may be carried out at a temperature in the range of from 25° C. to less than 500° C., and step (c) may be carried out at a temperature in the range of from 500-700° C.

Alternatively, different compounds may be used as the passivating agent in step (b2) and as the pyrolytic carbon precursor in step (c). For example, the electroactive material may first be contacted with a passivating agent in step (b2), followed by deposition of a conductive pyrolytic carbon material in step (c), wherein the pyrolytic carbon precursor used in step (c) is different from the passivating agent used in step (b2). For example, the passivating agent in step (b2) could be styrene, and the pyrolytic carbon precursor in step (c) could be a compound such as cyclohexane which is capable of forming a pyrolytic carbon material but is not capable of passivating the electroactive material surface. Where the passivating agent and pyrolytic carbon precursor are different materials, steps (b2) and (c) may be carried out at the same temperature, for example in the range of from 500-700° C. Alternatively, step (c) may be carried out at a higher temperature than step (b2). For example, step (b2) may be carried out at a temperature in the range of from 25° C. to less than 500° C., and step (c) may be carried out at a temperature in the range of from 500-700° C.

A further suitable passivating agent is ammonia. Step (b2) may therefore comprise contacting the surface of the deposited electroactive material with ammonia at a temperature in the range of from 200-800° C., preferably from 400-700° C. For example, where the passivating agent is ammonia, step (b2) may be carried out at the same temperature as is used to deposit the electroactive material in step (b). The temperature is then increased if necessary into the range of 500-1,000° C. to form a crystalline nitride surface (e.g. a silicon nitride surface of the formula $SiN_x$, wherein x≤4/3). Passivation with ammonia therefore provides an alternative means to limit oxidation of the electroactive material. As sub-stoichiometric silicon nitride is conductive, this step will also result in the formation of a conductive network that will allow for faster charging and discharge of the electroactive material.

Optionally, the method of the invention may include a step (d) of depositing a conductive coating onto the surface of the particles from step (c), wherein the conductive coating is different from the lithium-ion permeable filler material. For instance, the conductive coating may be a conductive carbon coating as described above. Preferably, step (d) comprises depositing a conductive coating via a chemical vapour deposition (CVD) method using a pyrolytic carbon precursor, optionally together with a gaseous dopant precursor. Suitable pyrolytic carbon precursors and gaseous dopant precursors In a third aspect of the invention, there is provided a composite material that is obtainable by the process of the second aspect of the invention. In particular, there is provide a composite material obtainable by a method comprising passivation of the electroactive material as set out above. The composite material of the third aspect of the invention may also have any of the features set out in relation to the first aspect of the invention.

In a fourth aspect of the invention, there is provided a composition comprising a particulate material according to the first or third aspects of the invention and at least one other component. In particular, the particulate material of the first or third aspects of the invention may be used as a component of an electrode composition. The particulate material used to prepare the electrode composition of the fourth aspect of the invention may have any of the features described as preferred or optional with regard to the first or third aspects of the invention.

The at least one other component may be selected from: (i) a binder; (ii) a conductive additive; and (iii) an additional particulate electroactive material.

The compositions of the invention suitably comprise from 1 to 95 wt %, or from 2 to 90 wt %, or from 5 to 85 wt %, or from 10 to 80 wt % of the particulate material according to the first or third aspects of the invention, based on the total dry weight of the composition.

For example, the composition may be a hybrid electrode composition which comprises a particulate material according to the first or third aspects of the invention and at least one additional particulate electroactive material. Examples of additional particulate electroactive materials include graphite, hard carbon, silicon, tin, germanium, gallium, aluminium and lead. The at least one additional particulate electroactive material is preferably selected from graphite and hard carbon, and most preferably the at least one additional particulate electroactive material is graphite.

Preferably, the at least one additional particulate electroactive material is selected from graphite particles having a $D_{50}$ particle diameter in the range from 10 to 50 μm.

The electrode composition may optionally comprise a binder. A binder functions to adhere the electrode composition to a current collector and to maintain the integrity of the electrode composition. Examples of binders which may be used in accordance with the present invention include polyacrylic acid (PAA) and alkali metal salts thereof, and modified polyacrylic acid (mPAA) and alkali metal salts thereof, SBR and CMC. The binder may suitably be present in an amount of from 0.5 to 20 wt %, preferably 1 to 15 wt % and most preferably 2 to 10 wt %, based on the total dry weight of the electrode composition.

The electrode composition may optionally comprise one or more conductive additives. Preferred conductive additives are non-electroactive materials which are included so as to improve electrical conductivity between the electroactive components of the electrode composition and between the electroactive components of the electrode composition and a current collector. The conductive additives may suitably be selected from carbon black, carbon fibers, carbon nanotubes, graphene, acetylene black, ketjen black, metal fibers, metal powders and conductive metal oxides. Preferred conductive additives include carbon black and carbon nanotubes.

The one or more conductive additives may suitably be present in a total amount of from 0.5 to 20 wt %, preferably 1 to 15 wt % and most preferably 2 to 10 wt %, based on the total dry weight of the electrode composition.

In a fifth aspect, the invention provides an electrode comprising a particulate material as defined with reference to the first or third aspects of the invention in electrical contact with a current collector. The particulate material used to prepare the electrode of the fifth aspect of the invention may have any of the features described as preferred or optional with regard to the first or third aspects of the invention.

As used herein, the term current collector refers to any conductive substrate which is capable of carrying a current to and from the electroactive particles in the electrode composition. Examples of materials that can be used as the current collector include copper, aluminium, stainless steel, nickel, titanium and sintered carbon. Copper is a preferred material. The current collector is typically in the form of a foil or mesh having a thickness of between 3 to 500 μm. The particulate materials of the invention may be applied to one or both surfaces of the current collector to a thickness which is preferably in the range from 10 μm to 1 mm, for example from 20 to 500 μm, or from 50 to 200 μm.

Preferably, the electrode comprises an electrode composition as defined with reference to the fourth aspect of the invention in electrical contact with a current collector. The electrode composition may have any of the features described as preferred or optional with regard to the fourth aspect of the invention.

The electrode of the fifth aspect of the invention may suitably be fabricated by combining the particulate material of the invention (optionally in the form of the electrode composition of the invention) with a solvent and optionally one or more viscosity modifying additives to form a slurry. The slurry is then cast onto the surface of a current collector and the solvent is removed, thereby forming an electrode layer on the surface of the current collector. Further steps, such as heat treatment to cure any binders and/or calendaring of the electrode layer may be carried out as appropriate. The electrode layer suitably has a thickness in the range from 20 μm to 2 mm, preferably 20 μm to 1 mm, preferably 20 μm to 500 μm, preferably 20 μm to 200 μm, preferably 20 μm to 100 μm, preferably 20 μm to 50 μm.

The electrode of the fifth aspect of the invention may be used as the anode of a metal-ion battery. Thus, in a sixth aspect, the present invention provides a rechargeable metal-ion battery comprising an anode, the anode comprising an electrode as described above, a cathode comprising a cathode active material capable of releasing and reabsorbing metal ions; and an electrolyte between the anode and the cathode.

The metal ions are preferably lithium ions. More preferably the rechargeable metal-ion battery of the invention is a lithium-ion battery, and the cathode active material is capable of releasing and lithium ions.

In a seventh aspect, the invention provides the use of a particulate material as defined with reference to the first or third aspects of the invention as an anode active material. Preferably, the particulate material is in the form of an electrode composition as defined with reference to the fourth aspect of the invention.

EXAMPLE 1: SYNTHESIS OF COMPOSITE PARTICLES IN A FLUIDISED BED REACTOR

Composite particles containing silicon as the electroactive material and a pyrolytic carbon material as the lithium-ion permeable filler were prepared in a vertical bubble-fluidized bed reactor comprising an 83 mm internal diameter stainless steel cylindrical vessel. A 75 g quantity of a powder of porous carbon framework particles was placed in the reactor and the reactor was then sealed and purged with nitrogen gas for 30 mins at a flow rate of 2 L/min. A pneumatic vibrator system was used to agitate the particle bed.

The reactor is then heated to a reaction temperature of between 430° C. and 460° C. at a ramp rate of 10° C. per minute and 4% v/v monosilane gas diluted in nitrogen was supplied to the bottom of the reactor at a flow rate of 3 L/min. Silicon deposition was continued for 9 hours then the reactor was again purged with nitrogen for 15 minutes. The reactor temperature was then ramped to a target temperature of 675° C. under nitrogen flow. An excess amount of styrene was placed in a Dreschel bottle and heated in a water bath, up to 75° C. After 10 minutes of furnace temperature stabilisation, styrene was allowed to flow into the reactor tube for 30 to 90 minutes by bubbling nitrogen of 2 L/min into the Dreschel bottle. The reactor then was purged with nitrogen and cooled down to ambient temperature under nitrogen, resulting in a carbon coated material. The atmosphere is then switched over to air gradually over a period of two hours by incrementally switching the gas flow from nitrogen to air from a compressed air supply.

The invention claimed is:

1. A particulate material consisting of a plurality of composite particles, wherein the composite particles comprise:
    (a) a conductive porous particle framework comprising micropores and mesopores, wherein the micropores and mesopores have a total pore volume in the range from 0.4 to 1.2 $cm^3/g$;
    (b) a plurality of nanoscale electroactive material domains disposed within the porous conductive particle framework;
    (c) a lithium-ion permeable filler penetrating the pores of the porous conductive particle framework and disposed intermediate the nanoscale electroactive material domains and the exterior of the composite particles;
    wherein the volumetric ratio of micropores to mesopores in the conductive porous particle framework is from 85:15 to 55:45;
    wherein the electroactive material is silicon; and
    wherein the weight ratio of silicon to the conductive porous particle framework in the composite particles is in the range from $[0.5 \times P_1$ to $1.3 \times P_1]:1$, wherein $P_1$ is a dimensionless quantity having the magnitude of the total pore volume of micropores and mesopores in the conductive porous particle framework when expressed in $cm^3/g$.

2. A particulate material according to claim 1, wherein the total volume of micropores and mesopores in the conductive porous particle framework is at least 0.6 $cm^3/g$.

3. A particulate material according to claim 1, wherein the conductive porous particle framework has a $PD_{90}$ pore diameter of no more than 10 nm.

4. A particulate material according to claim 1, wherein the conductive porous particle framework is a conductive porous carbon particle framework.

5. A particulate material according to claim 1, wherein the conductive porous particle framework has a BET surface area of at least 750 $m^2/g$ and no more than 4,000 $m^2/g$.

6. A particulate material according to claim 1, wherein the composite particles comprise at least 80 wt % in total of silicon and carbon.

7. A particulate material according to claim 1, wherein at least 90 wt % of the electroactive material mass in the composite particles is located within the internal pore volume of the conductive porous particle framework.

8. A particulate material according to claim 1, wherein the lithium-ion permeable filler material is a conductive pyrolytic carbon material.

9. A particulate material according to claim 1, wherein the lithium-ion permeable filler material is a lithium-ion permeable solid electrolyte.

10. A particulate material according to claim 9, wherein the lithium-ion permeable solid electrolyte also forms a coating over at least a portion of the outer surface of the conductive porous particle framework.

11. A particulate material according to claim 1, wherein the composite particles have a $D_{50}$ particle diameter in the range from 1 to 30 μm.

12. A particulate material according to claim 1, wherein the composite particles have a BET surface area of no more than 200 m²/g and at least 0.1 m²/g.

13. A particulate material according to claim 1, wherein the volume of micropores and mesopores of the composite particles, as measured by nitrogen gas adsorption, is no more than $(0.15 \times P_1)$ cm³/g.

14. A particulate material according to claim 1, having specific capacity on lithiation of 1200 to 2340 mAh/g.

15. A composition comprising a particulate material according to claim 1 and at least one other component selected from: (i) a binder; (ii) a conductive additive; and (iii) an additional particulate electroactive material.

16. An electrode comprising a particulate material according to claim 1 in electrical contact with a current collector.

17. A rechargeable metal-ion battery comprising:
(i) an anode, wherein the anode comprises an electrode as described in claim 16;
(ii) a cathode comprising a cathode active material capable of releasing and reabsorbing metal ions; and
(iii) an electrolyte between the anode and the cathode.

* * * * *